Dec. 29, 1942.    K. KNIBBE    2,306,959
CRANKSHAFT DYNAMIC BALANCING MEANS
Filed Oct. 19, 1939    2 Sheets-Sheet 1
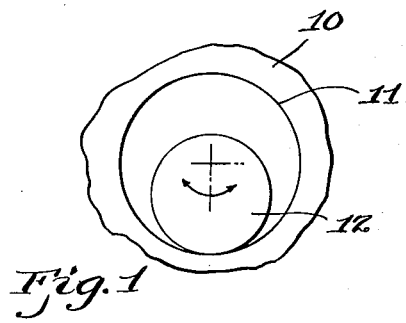
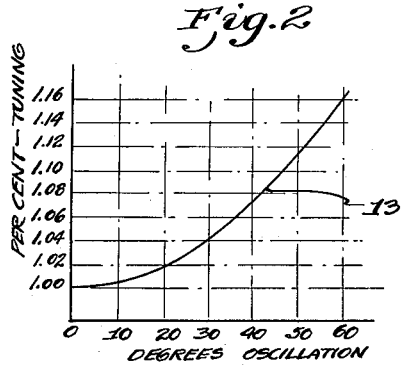
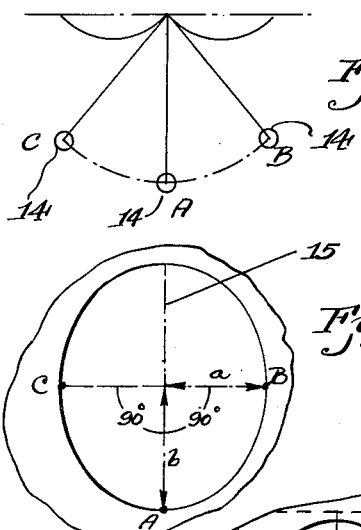
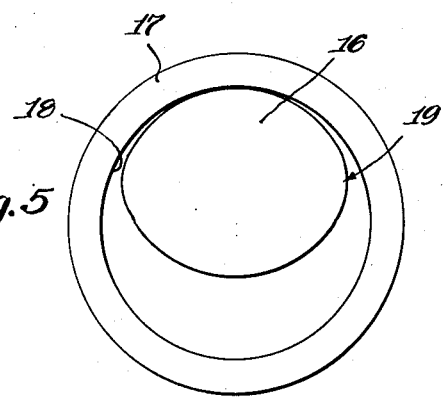
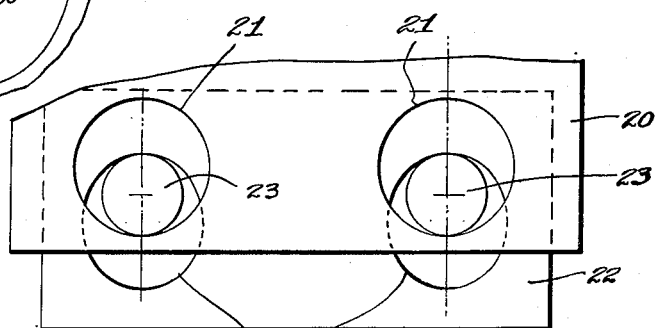
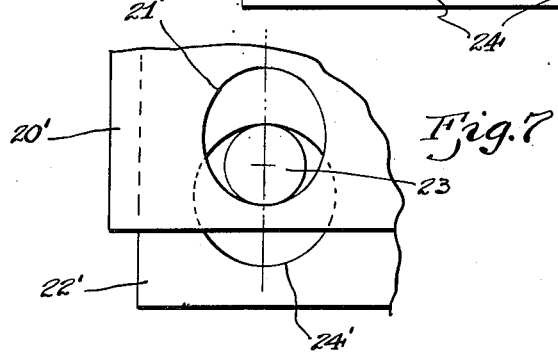
INVENTOR.
Klaas Knibbe
BY
ATTORNEY.

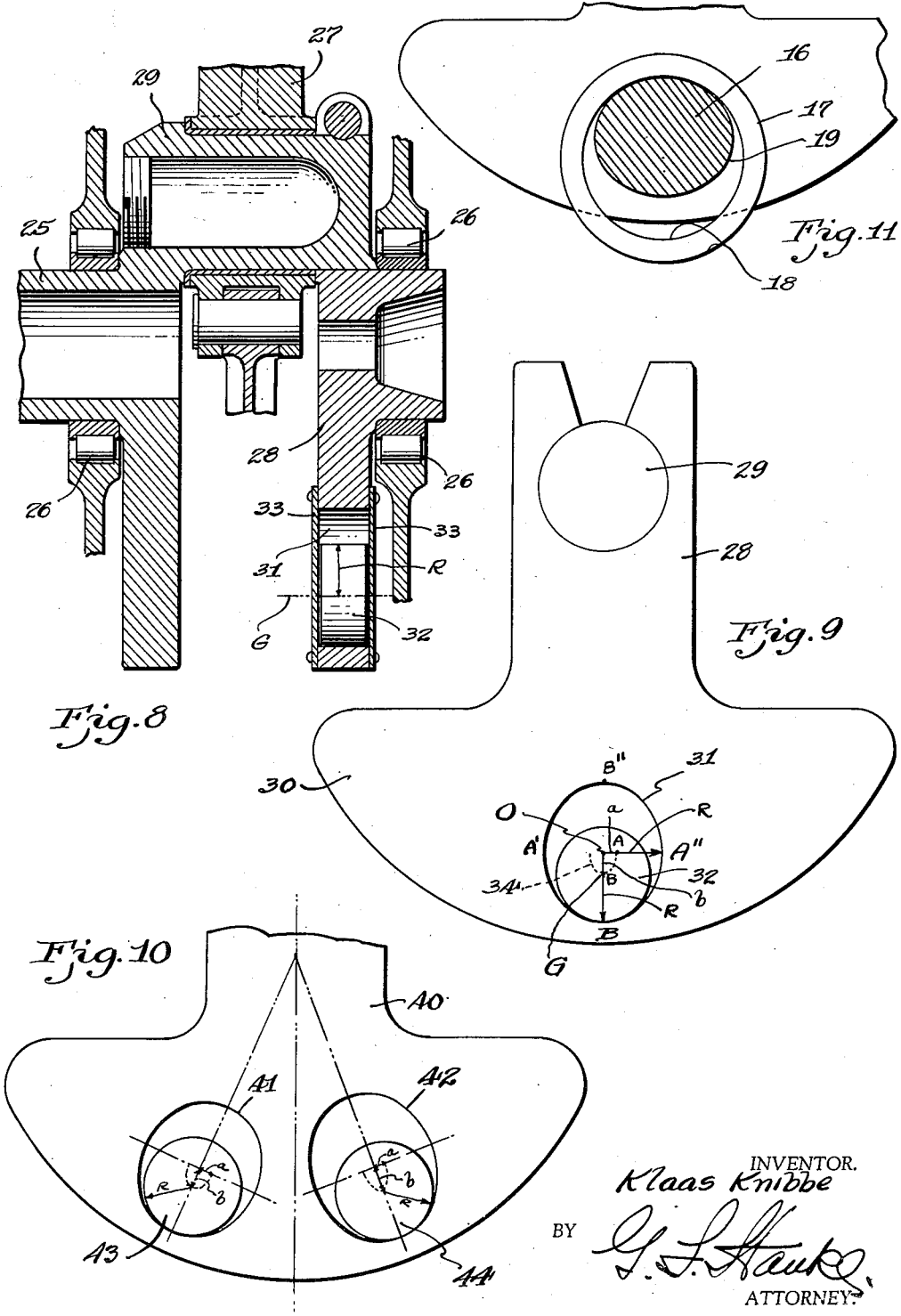

Patented Dec. 29, 1942

2,306,959

UNITED STATES PATENT OFFICE 2,306,959

CRANKSHAFT DYNAMIC BALANCING MEANS

Klaas Knibbe, Dearborn, Mich., assignor, by mesne assignments, to Continental Aviation and Engineering Corporation, a corporation of Virginia Application October 19, 1939, Serial No. 300,221

9 Claims. (Cl. 74—604)

This invention relates to a torsional vibration damper. In general most aircraft engines employ dampers in which a pendulum mass is suspended from the shaft so as to have, when stabilized by centrifugal force, a frequency which increases in direct proportion to the rotational speed of the shaft. However, my device is so constructed so as to cause a mass to oscillate at the same frequency for all amplitudes of oscillations. The increase in speed of a shaft and the torsional vibrations set up in said shaft vary in proportion, and as the vibrations increase in amplitude the angle of oscillation increases.

It is known that pendulums, if made synchronous with the impulses to which the shaft is subjected, will swing 180 degrees out of phase with those impulses, which impulses are accordingly neutralized to the elimination of tortional vibrations.

It is known that a properly tuned pendulum attached to the crankshaft of an engine will eliminate torsional vibration set up in said shaft. These vibrations are usually dampened by constructing the entire counterweight of the engine as a swinging mass. Another arrangement that has heretofore been used is the construction of a comparatively small cylindrical mass for oscillatory movement inside a circular or round hole. Both of these constructions provide substantially correct balance for small angles of motion. The angles of oscillation sometimes become vary large and under these circumstances, the tuning of the pendulum will vary for different angles of oscillation. This variation in tuning is unappreciable for small angles of oscillation, substantially up to about 20 degrees, but when the mass swings through an angle of greater magnitude the tuning of the pendulum changes at a faster rate and it is known that when the mass swings through an angle of 60 degrees the tuning of the pendulum changes as much as 16 per cent (16%). A large mass does not of course swing through a large angle, and therefore the present invention is primarily concerned with a damper of the type employing a relatively small roller or mass. In many aircraft engines a large mass is employed and same is designed to oscillate through an angle of about five to ten degrees.

An object of the present invention is to provide a damper construction of the type specified, which is constructed to utilize a small mass that is permitted to oscillate through a large angle, but which is so constructed as to not materially change the tuning of the pendulum mass.

Another object of the present invention is to provide for simplicity in construction by employing a relatively small mass which is effective to dampen torsional vibration of maximum amplitude.

In the drawings:

Fig. 1 is a diagrammatic elevational view illustrating a small mass confined for movement in an oscillatory path within a circular opening, Fig. 2 is a graphical illustration of the change in pendulum tuning resulting from different amplitudes of oscillation of a pendulum mass as illustrated in Fig. 1, Fig. 3 is a diagrammatic view illustrating the theory of a cycloidal suspension for obtaining a uniform tuning of a pendulum mass as is commonly used in very accurate clock mechanisms, Fig. 4 is a diagrammatic view of the arrangement employed in constructing the present improved type of torsional damper, the curve C—A—B representing the desired travel of the center of gravity of the oscillating mass, Fig. 5 is a diagrammatic view illustrating a modified form of construction, Fig. 6 is a diagrammatic view illustrating a bifilar suspension in which the oscillatory mass is provided with a curved surface formed by an elliptical recess engaging of cylindrical roller freely rolling in a cylindrical recess carried by the counterweight, Fig. 7 is a diagrammatic view of a bifilar construction which is substantially the reverse of that shown in Fig. 6, Fig. 8 is a fragmentary longitudinal sectional view through an engine crankshaft, showing in section a counterweight or other suitable crankshaft extension and a pendulum type torsional damper embodied therewith, Fig. 9 is an elevational view of the counterweight or extension shown in Fig. 8, which illustrates in detail the construction of the pendulum damper included therewith, Fig. 10 is a fragmentary elevational view of a counterweight or extension provided with a torsional damper arrangement of modified construction and, Fig. 11 is a further modified form of construction.

In Fig. 1, a moving mass, such as a counterweight or crankshaft extension 10 is provided with a circular hole 11 whose axis extends parallel to the axis of rotation of the counterweight and provides a cylindrical surface engaged by a cylindrical roller 12 of less diameter than that of the hole 11, said roller being caused to oscillate in response to torsional vibrations set up in the engine shaft which are directly transmitted to the counterweight or extension 10. This roller 12 constitutes a mass which oscillates as a pendulum and when same is properly tuned will effectively eliminate torsional vibrations.

However, when such a small mass is oscillated or swung through a large angle the tuning of the pendulum will change. Professor J. P. DenHartog in an article entitled "Tuned pendulums" in a book entitled Contributions to the Mechanics of Solids, dedicted to S. Timoshenko, pages 17 to 26, and published by MacMillan, New York, 1938, has shown how the tuning of a pendulum will change when the degree of oscillation is increased. This is graphically shown by curve 3 in Fig. 2. It wil thus be noted that the tuning of the pendulum will change when the degree of oscillation is increased. It will thus be noted that the tuning of the pendulum will change as much as 16 per cent (16%) when the weight is allowed to oscillate through an angle of 60 degrees.

This construction is therefore very undesirable for a pendulum of relatively small mass, as a small mass will tend to oscillate through a larger angle than a large mass, and the damper effect is less effective. A small mass is desirable on account of lightness and simplicity but because the same is less effective for accurate dampening of the vibrations as set up in the present day engines the use of a small mass of this character has not been satisfactory.

In the present invention there has been devised a construction in which uniform tuning of the pendulum is obtained with any angle of oscillation, and this improved construction is based on the known principles of cycloidal suspension, as is used on very accurate operating clocks. In Fig. 3 the path of travel of the pendulum mass 14 is shown as A—B—A—C—A and is a curve different from a circular arc. This curve may be assimulated in a pendulum type torsional damper by providing a curved surface on which the mass rolls freely by forming an elliptical or oval shaped hole in the crankshaft counterweight or extension, and the mass, such as the cylindrical roller 12, may be arranged to be confined within this elliptical or oval shaped hole or recess.

In figuring the dimensions and shape of this oval hole or recess we can assume an extreme case when the pendulum swings through an angle of 90 degrees to either side of the center line 15 (see Fig. 4 in which the curve C—A—B represents the travel of the oscillatory mass). The distance $a$ is calculated in order that the time required for this maximum swing or oscillation is the same as for small oscillations, and the result has been mathematically determined to make $b$ of a length which is 1.175 times the length $a$. In other words the major axis of the elliptical path traveled by said mass is 1.175 times the minor axis.

In Fig. 5 there is illustrated a modified construction in which the inner member is stationary and oval shaped. In other words the inner member 16 is formed by an extension from the crankshaft counterweight or extension which is elliptical in cross section and the freely rolling mass comprises a ring 17 suspended on this extension and having an inner circular surface 19 engaging the elliptical surface of the extension.

This same principle can be embodied with a bifilar suspension as shown in Fig. 6 in which the crankshaft counterweight or extension 20 carries a pair of circular holes or recesses 21 and a pendulum type mass 22 is suspended from the counterweight by means of circular pins 23, these circular pins being rollers 23 which are engaged in the elliptical holes or recesses 24 carried by the mass 22. Fig. 7 illustrates a modified construction in which the hole 21' carried by the crankshaft counterweight or extension 20' is elliptical and the hole 24' in the mass 22' is circular.

The practical adaptation of this invention is illustrated in Figs. 8 and 9, and comprises a structure in which an engine crankshaft 25 is arranged to be supported in suitable bearings 26 and carries an articulated rod structure 27. A counterweight member 28 is secured to the crank 29 of the crankshaft in any suitable manner so as to rotate with the crankshaft. This counterweight, as is customary, is provided with an enlarged portion 30 of sufficient mass to offset the unbalanced forces of the engine and the torsional damper means is preferably carried in this counterweight member.

In the present instance this is accomplished by providing a bore or hole 31 extending through the crankcheek parallel to the crankshaft axis, this hole being oval or elliptical as shown and so dimensioned as to guide the mass 32 to travel in a definitely defined path, in which the dimension 0—B indicated by the line $b$ is 1.175 times the distance 0—A indicated by the line $a$. The cylindrical roller or mass 32 is confined within the oval or elliptical hole 31 and preferably closure plates 33 are secured to the crankshaft counterweight or extension 28 to close the ends of the hole 31 whereby to confine the cylindrical roller 32 to travel entirely within the hole. Point G designates the center of gravity of the roller 32 and the travel of this center of gravity G is indicated by the dotted line 34 in Fig. 9. It will be noted that the major axis B'—B'' of the hole 31 is greater than the minor axis A'—A''. $A'-A''=2a$ plus $2R$ and $B'-B''=2b$ plus $2R$ wherein R equals the radius of the mass 32. Thus the length of the major and minor axes of the hole can readily be determined as in all cases $b$ must be constructed 1.175 times the length $a$.

In Fig. 10 a counterweight 40 is provided with a pair of oval or elliptical holes 41 and 42 in which the freely rolling weights 43 and 44 are engaged, and it will be noted that the elliptical hole 41 is of different curvature than the elliptical hole 42 to provide for different tuning of the pendulum weights in the same counterweight.

However, both of these elliptical and oval holes are constructed in order to confine the travel of the mass in an elliptical path in the major axis of said elliptical curve is 1.175 times the minor axis.

In the modified construction shown in the Fig. 11 the extension 16 is oval or elliptical cross-sectioned and is constructed to cause the center of mass of the ring 17 to travel in an elliptical path in which the length of the major axis is 1.175 times the length of the minor axis.

It will be noted that these pendulums, as illustrated in the various forms in the accompanying drawings, are so constructed as to move in a path in which the frequency of oscillation is substantially constant for all amplitudes of oscillation. The center of gravity of these masses moves along a curved path which is not circular but whose curvature is determined by a well known mathematical formula, and the principal construction comprises a structure in which the curved surface on which the pendulum mass is arranged to be guided in a free oscillatory movement is so shaped as to result in oscillation of the mass with a substantial constant frequency for all amplitudes of oscillation of said mass.

It will be apparent that although the present invention has been illustrated in connection with preferred forms of construction, that various modifications and changes may be made therein without departing from the spirit of the invention or from the scope of the appended claims.

I claim:

1. In combination, a shaft, a member secured to said shaft and rotating therewith, said member having a closed elliptical opening offset from and extending parallel to the axis of said shaft, and a freely rolling right circular cylindrical vibration damping weight confined solely within said opening for oscillations in a non-circular arc, said elliptical opening having a major axis which is 1.175 times the length of the minor axis.

2. In combination, a shaft, a member secured to said shaft and having a closed elliptical opening therein, and a freely rolling right circular cylindrical vibration damping weight confined within said recess and confined to travel along a segment of said elliptical opening in which the major axis of the ellipse is 1.175 times the length of the minor axis, and being therefore operable to oscillate therein with a substantially constant frequency for all amplitudes of oscillations of said weight.

3. In combination, a shaft, a freely rolling oscillating pendulum type damper comprising a right circular cylindrical mass, and guiding means therefor comprising a curved surface of an elliptical opening rotating with said shaft and constructed with a major axis that is 1.175 times the length of the minor axis, whereby to confine the movement of said mass solely within said opening to a non-circular oscillatory path whereby the frequency of oscillation of said mass remains substantially constant for all amplitudes of oscillations of said mass.

4. In combination, a shaft, a member secured to said shaft for rotation therewith, guiding means carried by said member and comprising a full elliptical surface, a freely rolling right circular cylinder vibration damping mass engaging said elliptical surface and caused to oscillate in rolling contacting relation therewith in response to torsional vibrations set up in said shaft, said elliptical surface constructed with a major axis that is 1.175 times the length of the minor axis, whereby to confine the movement of said mass to an oscillatory path in which the frequency of oscillation remains substantially constant for all amplitudes of oscillations of said mass.

5. In combination, a shaft, a plurality of freely rolling oscillating pendulum type damper means each comprising a right circular cylindrical mass and guiding means therefor comprising closed elliptical openings rotating with the shaft and each constructed with a major axis that is 1.175 times the length of the minor axis, whereby to confine the movement of said masses to an oscillatory path in which the frequency of oscillation remains substantially constant for all amplitudes of oscillations of said masses.

6. In combination, a shaft, a plurality of freely rolling oscillating pendulum type damper means each comprising a right circular cylindrical mass and guiding means therefor comprising elliptical openings rotating with the shaft and each constructed with a major axis that is 1.175 times the length of the minor axis, whereby to confine the movement of said masses to an oscillatory path in which the frequency of oscillation remains substantially constant for all amplitudes of oscillations of said masses, said plurality of guiding means comprising elliptical openings of different major axes to provide different pendulum tuning for said separate masses.

7. In combination, a shaft, a member secured to said shaft for rotation therewith, guiding means carried by said member and comprising a curved surface, a freely rolling mass engaging said curved surface and caused to oscillate in rolling contacting relation with said curved surface in response to torsional vibrations set up in said shaft, said curved surface constructed as a segment of an ellipse having a major axis which is 1.175 times the length of the minor axis, whereby to confine the movement of said mass to an oscillatory path in which the frequency of oscillation remains substantially constant for all amplitudes of oscillations of said mass.

8. In combination, a shaft, a member secured to said shaft for rotation therewith, said member having a curved guiding surface, a freely rolling right circular cylindrical mass oscillating in rolling contact with said curved surface in response to torsional vibration set up in said shaft, said curved surface having a curvature constructed to confine the oscillatory travel of said freely rolling mass in such a way as to cause the center of mass to traverse a segment of an elliptical curve conforming to an ellipse having a major axis which is 1.175 times the length of the minor axis.

9. In combination, a shaft, a member secured to said shaft and having a curved surface, a freely rolling weight engaging said surface and caused to oscillate in response to torsional vibrations set up in said shaft, said curved surface constructed out of round and arranged to guide said weight to travel in an elliptical path conforming to an ellipse having a major axis which is 1.175 times the length of the minor axis, whereby to confine the travel of said weight to oscillate with a substantially constant frequency for all amplitudes of oscillations of said weight.

KLAAS KNIBBE.